March 26, 1957 G. B. CROFTS 2,786,940

SUPERHETERODYNE RECEIVER WITH COMMON VARIABLE SATURATING MEANS HAVING TRACKING PROVISION FOR TUNING INDUCTANCES

Filed Jan. 13, 1956 3 Sheets-Sheet 1

INVENTOR
GEORGE B. CROFTS
BY John J. Logan
ATTORNEY

INVENTOR
GEORGE B. CROFTS
BY John J. Rogan
ATTORNEY

March 26, 1957 G. B. CROFTS 2,786,940

SUPERHETERODYNE RECEIVER WITH COMMON VARIABLE SATURATING MEANS HAVING TRACKING PROVISION FOR TUNING INDUCTANCES

Filed Jan. 13, 1956 3 Sheets-Sheet 3

INVENTOR
GEORGE B. CROFTS
BY John J. Rogan
ATTORNEY

United States Patent Office 2,786,940

Patented Mar. 26, 1957

2,786,940

SUPERHETERODYNE RECEIVER WITH COMMON VARIABLE SATURATING MEANS HAVING TRACKING PROVISION FOR TUNING INDUCTANCES

George B. Crofts, Livingston, N. J., assignor to National Union Electric Corporation, Orange, N. J., a corporation of Delaware Application January 13, 1956, Serial No. 558,978

11 Claims. (Cl. 250—20)

This invention relates to inductance systems and more especially it relates to systems wherein the inductance of a control device is electromagnetically varied by electric signals.

Many proposals have been made heretofore to utilize the magnetic saturation of a magnetizable core to control the frequency or impedance of an associated circuit. While such proposals have found utility to certain limited extents, they have not been found practicable where a plurality of associated devices or circuits are to be controlled, either because of the cost of the reactor devices required, or because of the difficulty of magnetically segregating the several reactor units from each other so that undesirable interaction does not occur.

Accordingly, it is one of the principal objects of this invention to provide a novel system for controlling the impedance or the frequency of a plurality of separate circuits or devices, by employing a single magnetic system having a plurality of discrete saturatable magnetic elements which cooperate with the single magnetic system, but which saturatable elements can be individually controlled by respective signals without undesirable mutual interaction.

Another object is to provide a variable inductance system employing a magnet for setting up a magnetizing field, and an electromagnetic signal-energized device having signal-controlled magnetizing windings which are substantially completely enclosed within respective saturatable magnetic housings, which can be located in the field of said magnet whereby the inductance of said windings can be simultaneously varied while completely isolating the magnetic fields of said windings from interaction with each other and with other devices external to the magnet.

Another object is to provide an improved signal-controlled saturatable reactor magnetic transducing system.

A further object is to provide a simple, efficient and reliable system for controlling the impedance or tuning of a plurality of separate circuits which are required to be magnetically isolated from each other, such for example as the successive tuned stages of a plural-stage radio frequency amplifier, or the radio frequency amplifier or oscillator stages of a superheterodyne radio receiver and the like.

A feature of the invention relates to a signal-controlled variable inductance system employing a magnetic circuit either in the form of a permanent magnet, an electromagnet, or a solenoid winding, in conjunction with a plurality of discrete saturatable reactors, each comprising its own winding and enclosing magnetic core-housing; all the reactors being located in magnetizable permeability-controllable relation with said magnet, but without undesirable mutual coupling between said windings.

A further feature relates to an improved remotely controlled tuning system such for example as the tuning stages of a radio receiver, whereby the tuning of the various elements can be effected entirely over electric conductors and without requiring any moving elements such as movable condensers, servo-motors and the like.

A still further feature relates to the novel organization, arrangement, and relative location and inter-connection of parts which cooperate to provide a novel signal-controlled system employing a plurality of discrete saturatable magnetic core devices.

Other features and advantages not specifically enumerated will be apparent after a consideration of the following detailed descriptions and the appended claims. Accordingly in the drawing, Fig. 1 is a longitudinal sectional view of a signal-controlled plural stage magnetic system embodying features of the invention.

Figure 1:
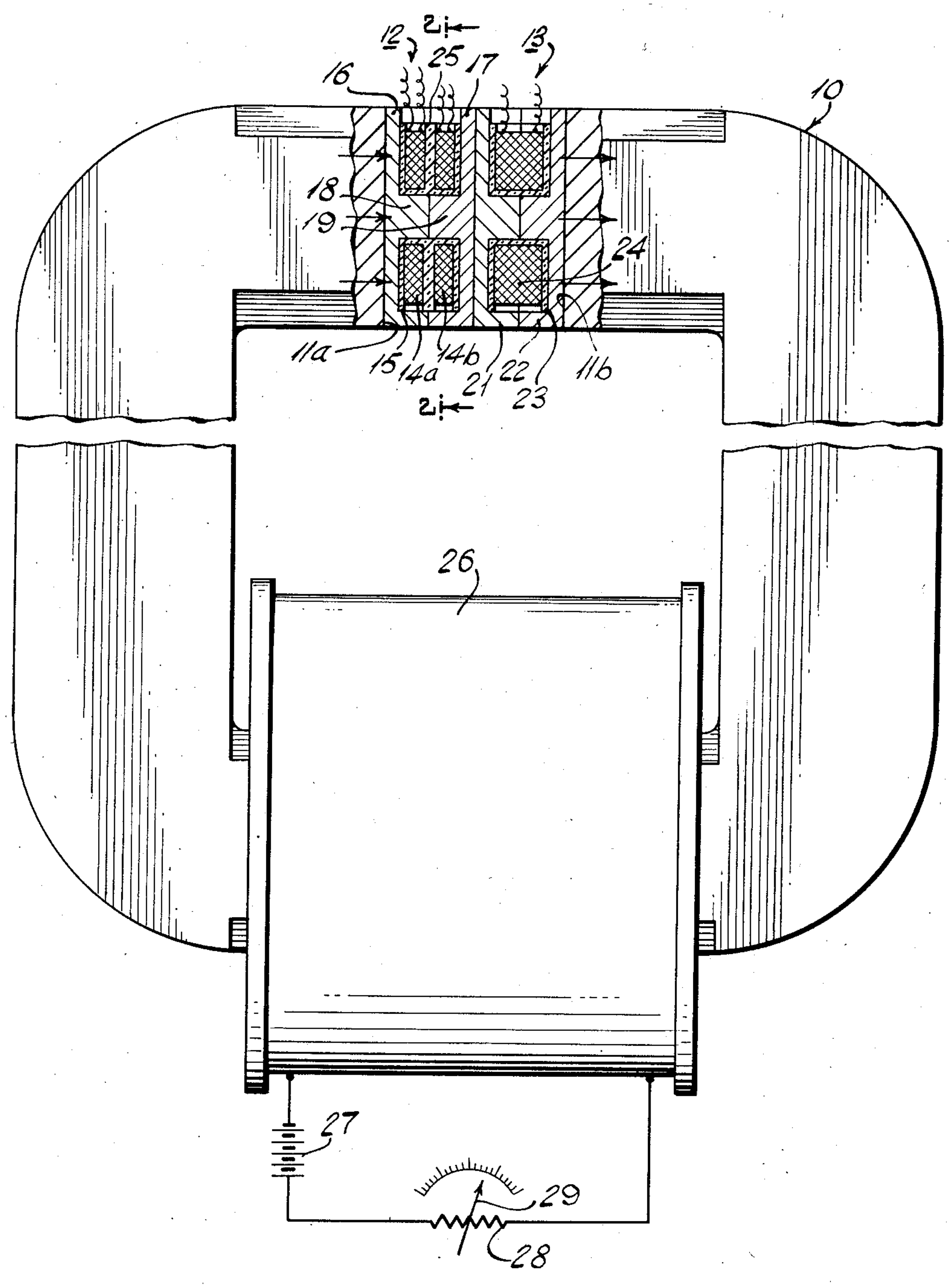
Figure 2:
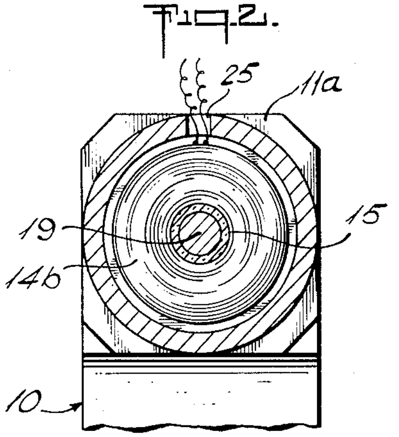
Fig. 2 is a sectional view of Fig. 1.

Referring to Figs. 1 and 2 of the drawings, the numeral 10 represents any well known magnetic construction whether of the permanent magnet kind or of the electromagnetic kind, and having for example a pair of pole pieces 11*a*, 11*b* for setting up a substantially uniform magnetic field as represented by the arrows. The gap between the pole pieces is magnetically closed by a magnetic system consisting of a plurality of similar magnetic saturatable reactor devices designated 12, 13. Each of the devices 12, 13, for example device 12, may comprise a pair of fine-wire coils 14*a*, 14*b*, which are wound on a suitable insulating form or bobbin 15. The windings 14*a*, 14*b* are completely enclosed within the two parts 16, 17 of a bi-part housing of magnetic material. That material should be of so-called high-frequency iron, for example compacted powdered iron such as is conventionally used in iron core inductances for high frequency transformers and the like.

Both halves 16, 17 of the magnetic housing can be of the same construction, for example of circular shape, each having an annular groove to receive the winding bobbin 15. The dimensions of the bobbin and the dimensions of the annular grooves are such that the said bi-part sections 16, 17 can be held in close abutting relation to define the completely enclosed annular chamber in which the two windings are located, thus substantially completely magnetically shielding the windings enclosed in one pot core from the windings in an adjacent pot core. The two halves 16, 17 can be held in their abutting coaxial relation, by any suitable means. However, if the center bosses 18, 19 on the two halves of the housing closely fit the bore 20 of the bobbin, such fastening means may not be required. Similarly the unit 13 comprises the two abutting pot core half sections 21, 22 each of high frequency ferro-magnetic material. In the particular example shown in Fig. 1 the winding bobbin 23 may carry only a single winding 24, which of course is completely housed and enclosed within the two abutting pot core sections 21, 22. The edges of the half sections for the two pot cores are provided with notches 25 at suitable points to permit the ends of the respective coils to be brought out for connection to respective external circuits to be controlled.

The two windings 14*a*, 14*b* being in mutual inductive relation may be used respectively as the primary and secondary windings of a tuned radio frequency transformer such for example as the antenna in-put transformer for the radio frequency stage of a radio receiver. Either or both windings 14*a*, 14*b* can be shunted by a respective fixed condenser to determine the tuning band of the transformer. In order to tune the transformer to any frequency within the band, the magnetization of the magnetic core 10 can be adjusted in any suitable manner, for example, one leg of the magnet can be provided with a magnetizing winding 26 connected to a source of direct current 27 in series with an adjustable resistor 28, the adjustable arm 29 of which can be provided with a suitable frequency calibrated scale as shown in Fig. 1.

The degree of magnetization of the magnet core 10 determines the degree of magnetic saturation of the pot cores of units 12, 13 and hence it determines the permeability of those cores. With a predetermined number of turns for the windings 14*a*, 14*b*, the change in permeability of their respective pot cores will cause a corresponding simultaneous variation in the inductance of those windings and hence will vary the frequency to which both windings are tuned. The tuning band, of course, can be determined either by a fixed shunt capacitance across the windings or by their inherent capacitance. Likewise at the same time that the inductance of windings 14*a*, 14*b* is being varied, the inductance of winding 24 is also varied. Winding 24 may constitute the well known tank inductance for an electron tube oscillator, such as a Hartley oscillator, whose frequency therefore will be varied in accordance with the calibrated setting of the adjustable arm 29.

Figure 3:
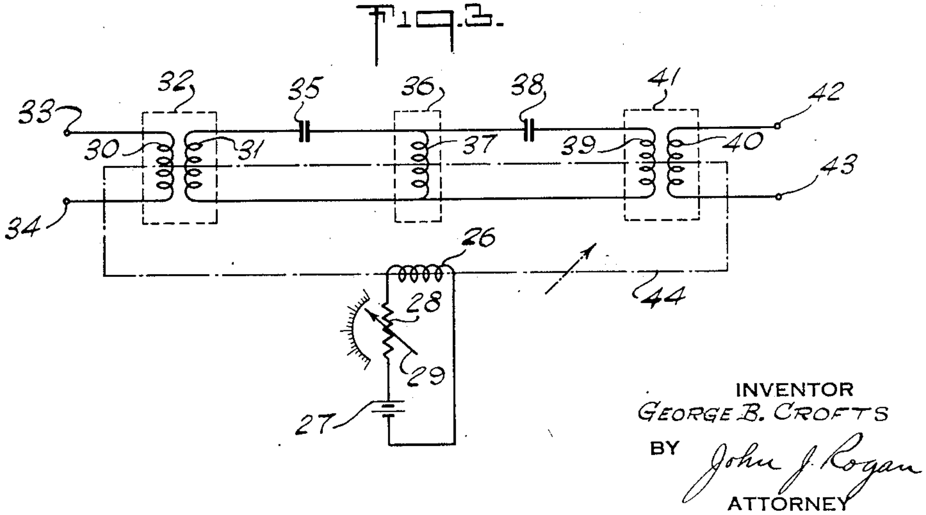
Fig. 3 shows the invention embodied in a filter.

It will be understood that the invention is not limited to the provision of only two pot cores with their respective enclosed windings for cooperation with the common magnetic circuit of core 10, thus, if a re-iterative filter is desired, then a number of such pot cores and respective completely enclosed windings may be used as shown schematically in Fig. 3 wherein the windings 30, 31 are completely enclosed within their bi-part pot core 32 similar to unit 12 of Fig. 1. The terminals of winding 30 are connected to the input terminals 33, 34 of the filter. The terminals of windings 31 can be connected for example through a fixed condenser 35 to the terminals of the single winding 37 enclosed within its pot core 36. Similarly the terminals of winding 37 can be connected through a fixed condenser 38 to one of the two windings 39, 40 which are enclosed within their respective pot cores 41. The terminals of winding 40 can be connected to output terminals 42, 43 of the filter. The common magnetic core system similar to core 10 of Fig. 1 is represented schematically in Fig. 2 by the dot-dash line 44, and the variable magnetization of this common magnetic core is represented schematically by the dot-dash arrow.

Figure 4:
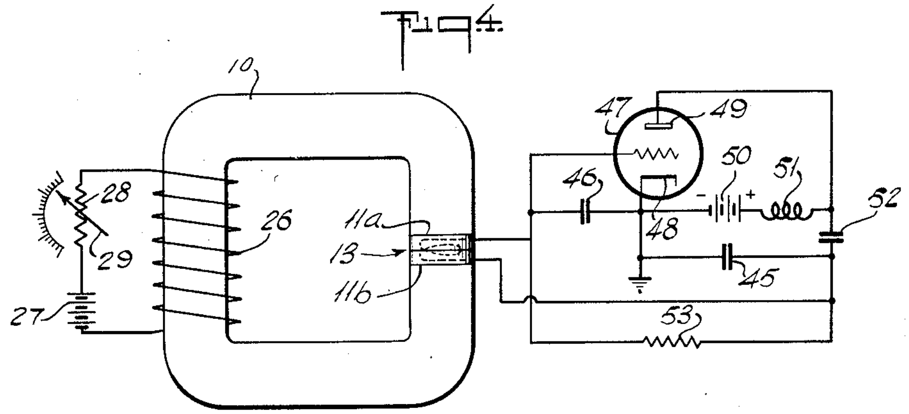
Fig. 4 shows the invention embodied in connection with a typical electron-tube oscillator.

Referring to Fig. 4 there is shown an arrangement for tuning the well known Colpitts oscillator, according to the invention. The parts shown in Fig. 4 which are identical with those in Fig. 1 bear the same designation numerals. Only a single pot core unit, for example unit 13, is located in the gap between the pole pieces 11*a*, 11*b*. The unit 13 may be connected in parallel with the series-connected tank condensers 45, 46 of a grid-controlled oscillator tube 47. The junction between the two tank condensers is connected to cathode 48. The direct current potential for the anode 49 is supplied by any well known direct current source 50 which may be connected in series with a filtering inductance 51, and also through condenser 52 to one terminal of the tank circuit and of the load circuit represented by resistor 53. The other terminal of the tank circuit and of the load circuit can be connected to the grid of tube 47. This circuit constitutes the well known Colpitts oscillator which includes the condensers 45, 46 and the inductance of unit 13 as the tank circuit. The magnetizing current of a magnitude determined by the setting of arm 29 and by the potential of source 27, flows through the winding 26 and sets up a magnetic flux across the gap of the core 10. That magnetic flux also flows through the completely closed pot core of unit 13 which thereby becomes saturated to an extent determined by the flux density and permeability of the high frequency iron of which it is constructed. Consequently if the source 27 is a constant voltage source, the resistance 28 can be varied to control the frequency of oscillator 46 by controlling the permeability of the pot core of unit 13, which thereby controls the inductance of the winding of unit 13 constituting the tank inductance of the oscillator.

Figure 5:
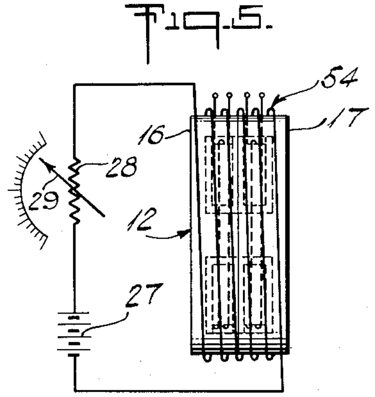
Fig. 5 is a modification of Fig. 4.

Instead of mounting the pot cores and their completely enclosed signal-energized windings within the magnetic gap of an electromagnet, the said pot cores and enclosed windings may be located within a solenoid winding. Such an arrangement is shown in Fig. 5, wherein a single pot core unit 12 which may be similar to the unit 12 of Fig. 1, is located coaxially within the solenoid winding 54. The magnetization of the winding 54 can be varied by the resistor 28 in series with the direct current supply source 27. The arrangement of Fig. 5 has the advantage that not only does it provide a simple way of varying the frequency of a circuit, but it also provides a more flexible control for providing a different frequency variation law for different pot core units in the magnetic chain.

Figures 6, 7, 8:
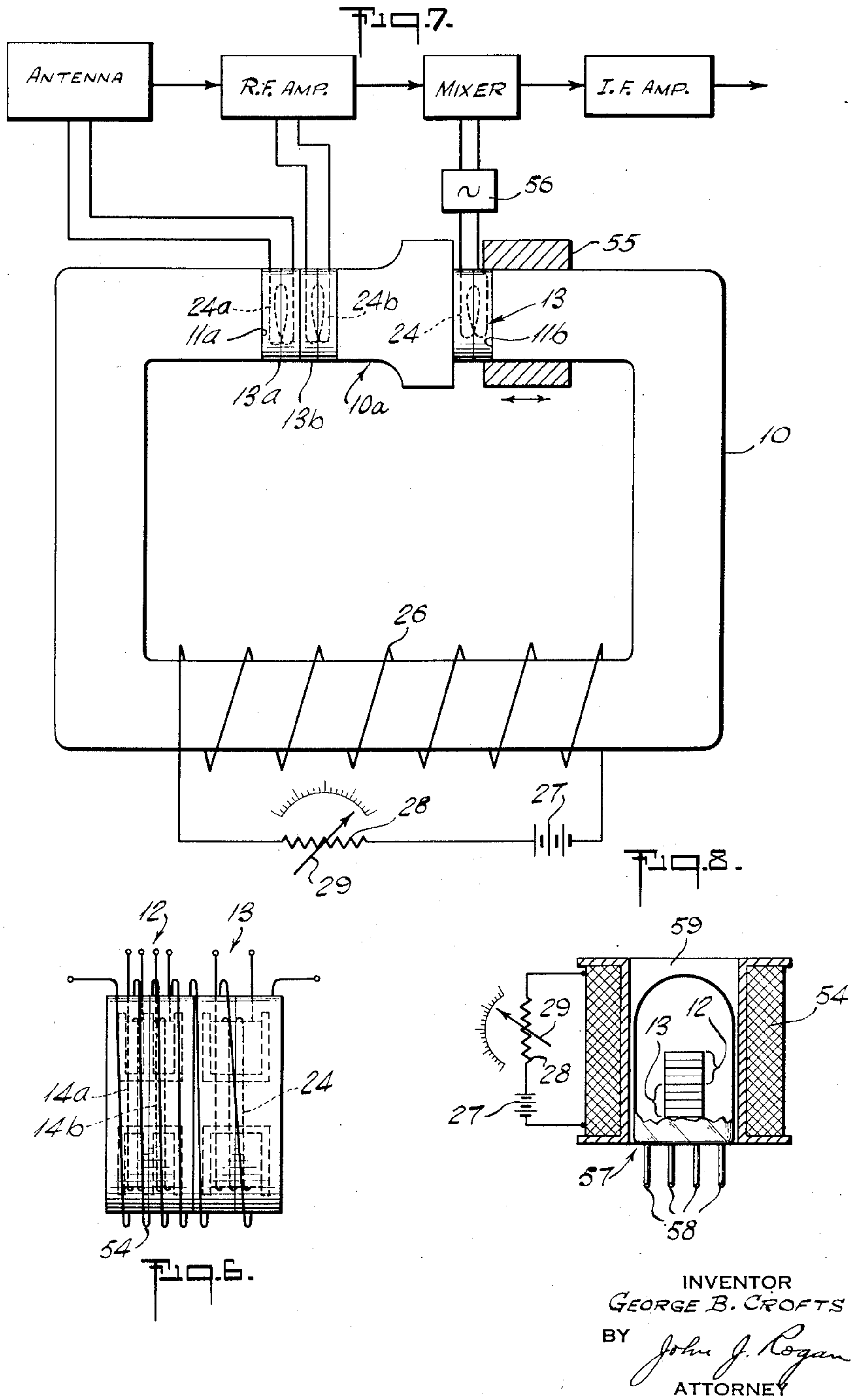
Fig. 6 is a modification of Fig. 5.
Figs. 7 and 8 are further modifications of the invention.

Thus as shown in Fig. 6 there may be provided two units 12, 13 which may be similar to the units 12 and 13 of Fig. 1. Thus unit 12 may have two windings 14*a*, 14*b* which may constitute the tuned transformer coupling between the antenna and the mixer of any well known superheterodyne radio receiver. The unit 13 may comprise the winding 24 which constitutes the oscillator tank inductance or frequency determining element of the local oscillator which also feeds the mixer. In such receivers it may be necessary to have the antenna and radio frequency coupling inductances tune over one frequency range with a ratio for example of 3 to 1, whereas the oscillator may be tunable over a ratio of 2 to 1. For that reason the winding 54 may have a greater number of turns where it surrounds the unit 12, as compared with the number of turns which surround the unit 13. In fact, if necessary, the turns surrounding the unit 13 may be non-uniformly spaced to provide the desired law of frequency variation of the associated local oscillator.

It will be clear that the device of Figs. 1 and 2 can be used in any conventional superheterodyne circuit. The unit 12 with its two windings 14*a* and 14*b* may constitute the tuned coupling transformer between the antenna and the mixer, and the unit 13 may constitute the tank inductance of the local oscillator. In order to obtain a special frequency tracking between the two units, it may be necessary to employ separate finely adjustable, powdered iron core inductors connected in parallel with the windings 14*a*, 14*b* and 24. However, Fig. 7 shows a modification of Fig. 1 which avoids the necessity of using such separate tracking inductances. The parts of Fig. 7 which are the same as those of Fig. 1 bear the same designations. However instead of locating the oscillator unit 13 directly adjacent the unit 12, there is interposed an enlarged magnet core section 10A. It will be understood, of course, that the units 12, 13 and the core section 10A are closely fitted in stacked relation between the ends or pole-pieces 11*a* and 11*b* of the core 10. Arranged to be slidably telescoped over the end 11*b* and over the unit 13 is a magnetic sleeve 55 which serves as an adjustable magnetic shunt for the unit 13. By suitable design of the parameters of unit 13 it has been found possible to provide good tracking of the frequency of the local oscillator 56 of which unit 13 is the frequency-determining element, and the antenna and radio frequency circuits to which the windings 24*a* and 24*b* of units 13*a*, 13*b* are respectively connected. For example in a superheterodyne receiver using the embodiment of Fig. 7 for use in the standard broadcast band, with the local oscillator having a frequency above the radio frequency signal, the oscillator coil may have an inductance range of 4 to 1, while the antenna and radio frequency amplifier coils cover a 9 to 1 range.

The embodiment of Fig. 5 or of Fig. 6 lends itself readily to a plug-in unit form of construction, in the nature of a tube such as a conventional radio tube. Thus as shown in Fig. 8 the units 12 and 13 which may be similar to the same units of Fig. 5 or 6, can be stacked and held in stacked array by any suitable means such as adhesive tape or cement. The stacked assembly can then be attached to any conventional pronged base 57 such as is usually employed in the construction of radio tubes. The various connections to the several windings of units 12 and 13 can then be made to the appropriate prongs or pins 58 carried by the base. If desired, the stacked assembly can be enclosed in a glass or non-magnetic bulb 59 which can be cemented to base 57. The magnetizing coil 54 such as shown in Fig. 5, or Fig. 6, can then be telescoped over and around the bulb 59 as shown in Fig. 8, and the magnetization of the said coil 54 can be adjusted by means of the adjustable resistance 28 and the series connected battery 27.

Various changes and modifications can be made in the disclosed embodiments without departing from the spirit and scope of the invention.

What is claimed is:

1. An adjustable inductance device comprising means defining a magnetic gap with a steady magnetic field thereacross, and a plurality of saturatable core reactor units mounted in said field to have their respective inductances varied by adjustment of the strength of said field, each reactor unit including at least one high frequency winding for connection to a corresponding high frequency circuit and each winding being substantially completely enclosed within a respective magnetic casing of high frequency iron whereby the windings of the said units are substantially completely shielded from each other with respect to interaction between their respective electromagnetic signal fields, and a movable magnetic member which is adjustable with respect to said gap to track the inductance variations of said reactor units over a predetermined frequency band.

2. An adjustable inductance device according to claim 1 in which said magnetic field defining means includes a magnetizing coil connected to a source of direct current of adjustable intensity whereby a single adjustment of said intensity simultaneously adjusts the inductance of both said units, and said movable member includes a magnetic shunt which is movable in telescoped relation over one of said reactor units.

3. An adjustable high frequency inductance comprising a plurality of inductor units mounted in adjacent stacked array, each unit comprising a high frequency magnetic casing having a high frequency signal winding enclosed therein, means for simultaneously adjusting the inductance of said units, the last-mentioned means comprising means to develop a single magnetic field of steady intensity together with means to adjust the intensity of said field to vary simultaneously the magnetic permeability of all said units and thereby to vary their respective inductances while shielding the units mutually from each other with respect to the signal currents in their respective windings, and a separate movable magnetic shunt which is adjustable with respect to one of said inductor units to track the inductance variations of said units over a predetermined frequency band.

4. An adjustable high frequency inductance system, comprising a plurality of inductor units of the saturatable core kind and mounted in adjacent stacked array, each unit comprising a high frequency iron casing having a high frequency winding therein for connection to a respective high frequency circuit to be tuned thereby, a magnetic core having a magnetic gap within which said units are mounted, a magnetizing winding for said core, a source of direct current connected to said magnetizing winding, means to adjust the said magnetizing current and thereby simultaneously to adjust the permeability of said casings and the inductance of their respective enclosed windings while substantially completely shielding the units against mutual coupling of their signal currents, and a separate movable magnetic shunt which is adjustable with respect to one of said inductor units to track the inductance variations of said units over a predetermined frequency band.

5. An adjustable inductance device having a plurality of stages for connection to respective stages of a high frequency signal transmission system which stages are to be simultaneously tuned by a single tuning control, comprising means to develop a steady magnetic field, a plurality of high frequency signal windings located in said field, separate high frequency iron enclosures for said windings respectively to prevent mutual signal coupling between said windings while allowing said magnetic field to pass through all said enclosures to determine the magnetic permeability thereof, means to adjust the intensity of said field and thereby simultaneously to adjust the inductance of each of said windings, and a separately movable magnetic member which is adjustable with respect to one of said enclosures to track the inductance variations of said windings over a predetermined frequency band.

6. An adjustable inductance device according to claim 5 in which each of said enclosures is in the form of a bipart cup-like member of high frequency iron, for example of compacted powdered iron and enclosing a respective winding, the said enclosures having substantially flat opposite faces whereby a series of such enclosures can be stacked in adjacent abutting relation while shielding their respective windings from undesirable signal coupling therebetween, and said separately movable magnetic member is mounted for telescoping movement with relation to one of said enclosures.

7. A signal transmission system having a plurality of high frequency signal transmission stages, a plurality of tunable inductance devices for interconnecting said stages, each device including a respective high frequency winding enclosed within a respective casing of high frequency iron, a magnet having a magnetic gap within which are serially stacked said inductance devices, a magnetizing winding for said magnet for producing a common steady magnetic field passing through all said casings to determine their respective permeabilities, means to adjust the intensity of said field and thereby to tune said stages simultaneously, and a movable magnetic member which is adjustable with respect to one of said inductance devices to track the inductance variations of said devices over a predetermined frequency band.

8. A signal transmission system of the kind having a radio frequency amplifier, and a local heterodyne oscillator, a first inductance unit for determining the tuning of said amplifier stage, a second inductance unit for determining the tuning of said oscillator, each of said units being mounted in a steady magnetizing field common to both units, each unit comprising a respective high frequency winding substantially enclosed within a respective casing of high frequency iron, means to adjust the intensity of said field and thereby to adjust the permeability of said casings simultaneously to tune said stages simultaneously, and a movable magnetic member which is adjustable with respect to one of said inductance units to track the tuning of said amplifier stage and said oscillator over a predetermined frequency band.

9. A signal transmission system according to claim 8 in which said movable magnetic member is mounted in adjustable telescoping relation with respect to one of said casings to provide an adjustable magnetic shunt between said field and said one of said casings to correlate the frequency tracking of said stages.

10. An adjustable high frequency inductance device comprising a plurality of separate saturatable core reactors each comprising a high frequency winding substantially completely enclosed within its respective casing of high frequency iron, said reactors being mounted in stacked array within a magnetic gap, and means including a magnetizing winding and an adjustable magnetic shunt for one of said reactors for producing a different magnetic field strength adjacent one of said reactors as compared with the field strength adjacent another reactor.

11. A high frequency inductance system having a plurality of discrete saturatable core reactor units, a magnet having a magnetic gap, one of said units being mounted adjacent one side of said gap, the other unit being mounted adjacent the opposite side of said gap, a supplementary core member sandwiched between said units and having a larger cross-section adjacent one unit as compared with its cross-section adjacent the other unit, and a tubular magnetic shunt adjustably mounted with respect to said gap and one of said units and cooperating with the enlarged portion of said supplementary core member to produce an adjustable annular magnetic shunt around said one unit.

References Cited in the file of this patent

UNITED STATES PATENTS

| | | |
|---|---|---|
| 2,026,758 | Turner | Jan. 7, 1936 |
| 2,201,254 | Will | May 21, 1940 |
| 2,361,187 | Foster | Oct. 24, 1944 |
| 2,462,423 | Polydoroff | Feb. 22, 1949 |
| 2,569,309 | Hepp | Sept. 25, 1951 |
| 2,581,202 | Post | Jan. 1, 1952 |
| 2,714,187 | Goodrich | July 26, 1955 |

FOREIGN PATENTS

| | | |
|---|---|---|
| 647,965 | Germany | July 17, 1937 |
| 225,079 | Switzerland | Dec. 31, 1942 |
| 244,706 | Switzerland | Sept. 30, 1946 |

OTHER REFERENCES

"The Wobby Oscillator," by Reyner, article in The Wireless World, August 11, 1938, pp. 112 to 114.